(12) United States Patent
Hishiyama (10) Patent No.: US 7,065,114 B2
(45) Date of Patent: Jun. 20, 2006

(54) APPARATUS AND METHOD FOR CONTROLLING OPTICAL DISC WRITE POWER

(75) Inventor: Hiroyuki Hishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 545 days.

(21) Appl. No.: 10/403,032

(22) Filed: Apr. 1, 2003

(65) Prior Publication Data
US 2003/0185126 A1   Oct. 2, 2003

(30) Foreign Application Priority Data
Apr. 1, 2002   (JP) .................... 2002-098863

(51) Int. Cl.
*H01S 3/00* (2006.01)
*H01S 3/13* (2006.01)

(52) U.S. Cl. ................ 372/38.04; 372/29.011; 372/29.012; 372/29.015; 372/38.01; 372/38.02; 372/38.07

(58) Field of Classification Search ........... 372/29.011, 372/29.012, 29.014, 29.015, 38.01, 38.02, 372/38.04, 38.07
See application file for complete search history.

(56) References Cited

U.S. PATENT DOCUMENTS

| | | | | |
|---|---|---|---|---|
| 4,799,224 A | * | 1/1989 | Bottacchi et al. | 372/38.02 |
| 4,833,680 A | * | 5/1989 | Kaiser et al. | 372/29.014 |
| 4,985,896 A | * | 1/1991 | Kimizuka et al. | 372/38.02 |
| 5,311,005 A | * | 5/1994 | Visocchi | 250/205 |
| 6,370,175 B1 | * | 4/2002 | Ikeda et al. | 372/38.1 |
| 6,466,595 B1 | * | 10/2002 | Asano | 372/29.021 |
| 6,917,639 B1 | * | 7/2005 | Ishida et al. | 372/38.02 |
| 2002/0085600 A1 | * | 7/2002 | Jung | 372/38.02 |
| 2003/0007438 A1 | * | 1/2003 | Kim et al. | 369/53.26 |
| 2003/0091076 A1 | * | 5/2003 | Fischer | 372/38.02 |

FOREIGN PATENT DOCUMENTS

| JP | 58-182144 A | 10/1983 |
|---|---|---|
| JP | 9-171631 A | 6/1997 |

* cited by examiner

*Primary Examiner*—James Menefee
(74) *Attorney, Agent, or Firm*—Sughrue Mion, PLLC (57) ABSTRACT

A simply structured apparatus according to the present invention corrects an overdrive power level. A main controller allows an overdrive power generator to set an overdrive power current to zero, allows a base power controller to control a base power current with the target value of a base power monitor level set to a desired overdrive power level. When the base power monitor level has reached the target value, the main controller allows said overdrive power generator to increase the overdrive power current until a base power control signal monitored by a base power control signal monitor reaches a value corresponding to a desired base power level.

14 Claims, 5 Drawing Sheets

APPARATUS AND METHOD FOR CONTROLLING OPTICAL DISC WRITE POWER

BACKGROUND OF THE INVENTION

1. Field of the Invention

The present invention relates to an apparatus and a method for controlling an optical disc write power used for an optical disc writer.

2. Description of the Related Art

Many optical disc writers have a configuration in which, in addition to the base power, an overdrive power is added to the beginning portion of the base power to prevent a write mark from being formed into a teardrop shape. In general, this type of optical disc writer has a read power APC (Auto Power Control) circuit that samples and holds (S/H) the read power level to keep the read power at a desired value and a base power APC circuit that samples and holds the base power level to keep the base power at a desired value. For the overdrive power, the writer has a configuration in which an overdrive current value corresponding to a predetermined power, or a current that is split from the base power current, is added as the overdrive current value.

However, because the overdrive pulse width is narrower than the base pulse width, it is difficult to stably sample and hold the overdrive power level and to perform APC processing that keeps the overdrive power at a desired value. On the other hand, as the write speed of an optical disc is increased and its write quality is improved recently, it is required that this overdrive amount be precisely output even if there is a variation in the circuit characteristics, the laser diode (LD) ages, or the drive temperature changes.

SUMMARY OF THE INVENTION

In view of the foregoing, it is an object of the present invention to provide an apparatus and a method for controlling an optical disc write power (hereinafter simply called "power control apparatus and method") that, though simple in configuration, can correct the overdrive power level.

An apparatus for controlling power according to the present invention controls power for writing on an optical disc, wherein one pulse of the power to be supplied to a laser diode for writing on an optical disc is composed of an overdrive power level and a base power level that follows the overdrive power level. The overdrive power level is higher in level and narrower in width than the base power level. The base power level corresponds to a base power current, while the overdrive power level corresponds to the sum of the base power current and an overdrive power current.

The apparatus for controlling power according to the present invention comprises a base power control signal monitor that monitors the base power control signal; an LD output level monitor that monitors a power level output by the laser diode; a base power controller that controls the base power current so that a power level monitored by the LD output level monitor matches a preset target value; an overdrive power generator that generates the overdrive power current; and a main controller that controls those components.

At the correction time of the power level, the main controller allows the overdrive power generator to set the overdrive power current to zero and allows the base power controller to control the base power current with the target value of the base power monitor level set to the overdrive power level that is desired. When the base power monitor level has reached the target value, the main controller allows the overdrive power generator to increase the overdrive power current until the base power control signal monitored by the base power control signal monitor reaches a value corresponding to a desired base power level. Such a function is implemented, for example, by a computer program.

When the desired overdrive power level is set as the target value of the base power controller with the overdrive power current set to zero, the base power controller increases the base power current until the desired overdrive power level is reached. In this state, the overdrive power generator gradually increases the overdrive power current. Then, in attempt to maintain the desired overdrive power level, the base power controller decreases the base power current by the amount of the increased overdrive power current. This is because the overdrive power level corresponds to the sum of the overdrive power current and the base power current. The base power level is lowered by the amount of decreased base power current and, when the base power level reaches the desired base power level, the overdrive power generator stops increasing the overdrive power current. Because the overdrive power current and the base power current at this time correspond to the desired overdrive power level and the desired base power level respectively, those power levels have been corrected. In this way, even if there is no means for controlling the overdrive power level, the base power controller may be used to correct the overdrive power level.

The apparatus may further comprises a switching unit that selects one of only the base power current and the sum of the base power current and the overdrive power current under an instruction of the main controller and supplies the selected current to the laser diode. In this case, the apparatus may be used not only to correct the overdrive power level but also to write on an optical disc.

It is also possible that, at the correction time of the power level, the switching unit selects the sum of the base power current and the overdrive power current.

In addition, it is also possible that the base power current plus a predetermined value of read power current correspond to the base power level and that the sum of the base power current and the overdrive power current plus the predetermined value of read power current correspond to the overdrive power level. In this case, the present invention may be applied also to an apparatus to which the read power current is constantly applied.

In addition, the apparatus may further comprises a switching unit that selects one of only the read power current, a sum of the read power current and the base power current, and a sum of the read power current, the base power current, and the overdrive power current under an instruction of the main controller and supplies the selected current to the laser diode. In this case, the apparatus may be used not only to correct the overdrive power level but also to write on or read from an optical disc.

It is also possible that, at the correction time of the power level, the switching unit selects the sum of the read power current, the base power current, and the overdrive power current.

A method for controlling power according to the present invention, provided for use on the apparatus for controlling power according to the present invention, corresponds to the configuration as defined in claims 1–4.

In other words, the apparatus according to the present invention comprises a read power APC circuit that samples and holds the read power level and controls the signal level, which has been sampled and held, at a desired value; a base power APC circuit that samples and holds the base power level and controls the signal level, which has been sampled and held, at a desired value; a base power control signal monitor circuit that monitors the base power control signal at that time, an overdrive select switch; and means for simply correcting three laser power levels with two APC circuit by temporarily setting the overdrive pulse width to the write data pulse width to do APC processing for the overdrive power using the base power APC circuit.

This configuration allows the overdrive power to be temporarily generated for the length of time the base power is generated to accurately correct the overdrive current value with the use of the base power APC circuit, giving a desired overdrive power level.

As described above, whether or not data is sent at a correct time may be checked by comparing the reference signal from a reference information recording medium with the standard value. Therefore, even if only the speed with which data is sent does not match the setting set up at manufacturing time, the time at which data should be sent may be reset to the setting set up at manufacturing time by checking the time at which data is sent. This enables data to be sent at a specification-conforming time and increases the reliability of an information read/write apparatus.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

FIGS. 2A–2C are graphs showing how the power control apparatus in FIG. 1 allows a laser diode to emit light at a desired laser output level, wherein

FIGS. 3A–3C are graphs showing how the power control apparatus in FIG. 1 performs correction operation to output a desired overdrive power level, wherein

DESCRIPTION OF THE PREFERRED EMBODIMENTS

Figure 1:
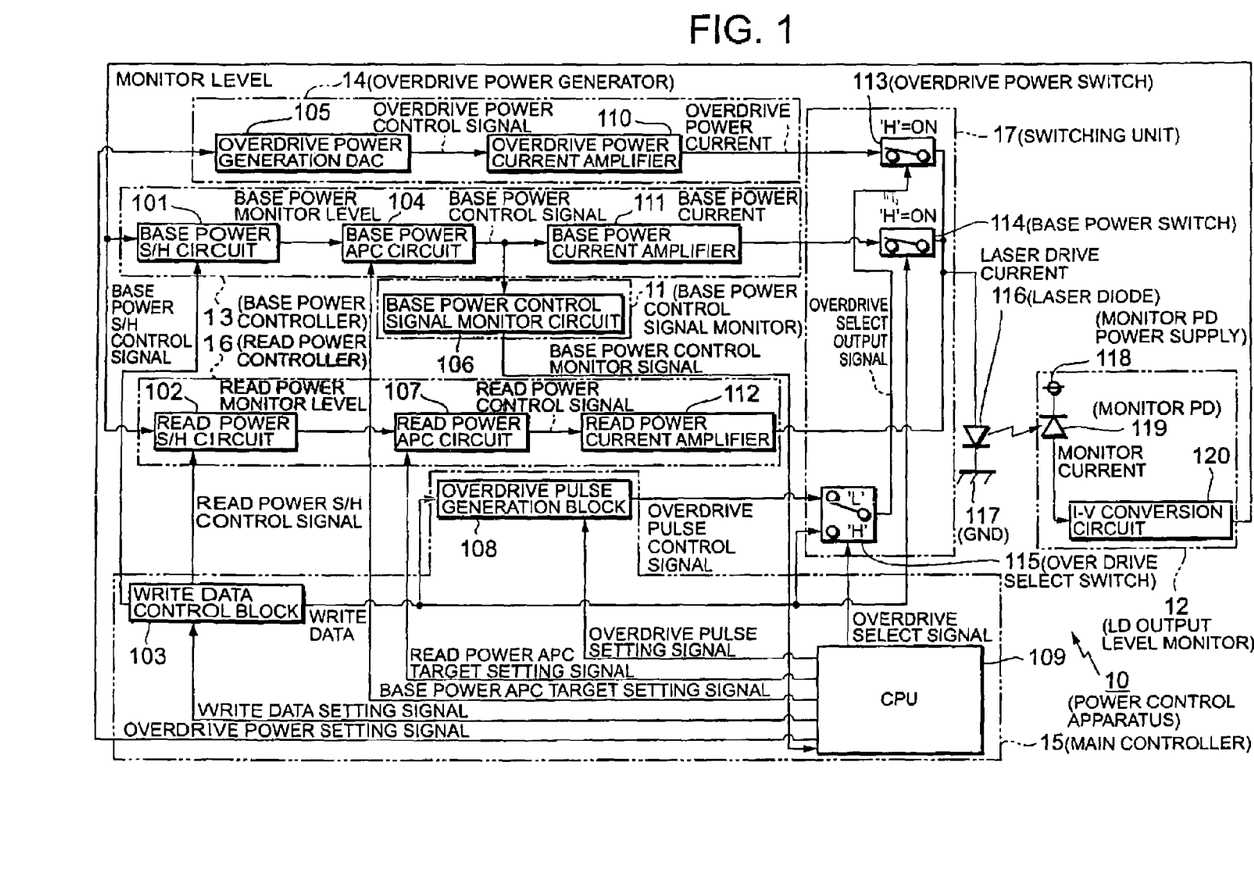
FIG. 1 is a block diagram showing an embodiment of a power control apparatus according to the present invention.

FIG. 1 is a block diagram showing an embodiment of a power control apparatus according to the present invention. The embodiment will be described below with reference to this drawing.

A power control apparatus 10 in this embodiment controls an optical disc write power. This optical disc write power is characterized in that one pulse of power supplied to a laser diode 116 for writing data on an optical disc is composed of an overdrive power level and a base power level that follows the overdrive power level, that the overdrive power level is higher in level and narrower in pulse width than the base power level, that the base power level corresponds to the sum of the read power current and the base power current, and that the overdrive power level corresponds to the sum of the read power current, base power current, and overdrive power current.

The power control apparatus 10 comprises a base power control signal monitor 11 that monitors the level of the base power control signal, an LD output level monitor 12 that monitors the level of power output from the laser diode 116, a base power controller 13 that controls the base power current such that the power level monitored by the LD output level monitor 12 matches a predetermined target value, an overdrive power generator 14 that generates an overdrive power current, and a main controller 15 that controls the components described above.

The main controller 15 sets the overdrive power current to zero via the overdrive power generator 14 and, with the target value of the base power monitor level set to a desired overdrive power level, controls the base power current via the base power controller 13. When the base power monitor level reaches the target value, the main controller 15 increases the overdrive power current via the overdrive power generator 14 until the base power control signal monitored by the base power control signal monitor 11 reaches a value corresponding to a desired base power level. The function like this is implemented, for example, by a computer program.

When the desired overdrive power level is set as the target value of the base power controller 13 with the overdrive power current set to zero, the base power controller 13 increases the base power current until the desired overdrive power level is reached. In this state, the overdrive power generator 14 gradually increases the overdrive power current. Then, in attempt to maintain the desired overdrive power level, the base power controller 13 decreases the base power current by the amount of the increased overdrive power current.

This is because the overdrive power level corresponds to the sum of the overdrive power current and the base power current. The base power level is lowered by the amount of decreased base power current and, when the base power level reaches the desired base power level, the overdrive power generator 14 stops increasing the overdrive power current. Because the overdrive power current and the base power current at this time correspond to the desired overdrive power level and the desired base power level respectively, those power levels have been corrected. In this way, even if there is no means for controlling the overdrive power level, the base power controller 13 may be used to correct the overdrive power level.

The power control apparatus 10 not only corrects the overdrive power level but also writes and reads data to or from an optical disc. To perform this function, the power control apparatus 10 comprises a read power controller 16 that controls the read power current and a switching unit 17 that switches the current so that the power level monitored by the LD output level monitor 12 matches a target value that is set in advance.

Under instructions from the main controller 15, the switching unit 17 selects one of three types of current amounts, that is, only the read power current, the sum of the read power current and the base power current, and the sum of the read power current, base power current, and overdrive power current, and supplies the selected current to the laser diode 116.

The base power control signal monitor 11 comprises a base power control signal monitor circuit 106. The LD output level monitor 12 comprises a monitor PD (Photo Detector) power supply 118, a monitor PD 119, and a I-V conversion circuit 120. The base power controller 13 comprises a base power S/H circuit 101, a base power APC circuit 104, and a base power current amplifier 111. The overdrive power generator 14 comprises an overdrive power generation DAC (Digital to Analog Converter) 105 and an overdrive power current amplifier 110.

The main controller 15 comprises a write data control block 103, an overdrive pulse generation block 108, and a CPU 109. The read power controller 16 comprises a read power S/H circuit 102, a read power APC circuit 107, and a read power current amplifier 112. The switching unit 17 comprises an overdrive power switch 113, abase power switch 114, and an overdrive select switch 115. The CPU 109 is a one-chip microcomputer including, for example, a RAM, ROM, and input/output interface.

That is, the power control apparatus 10 in this embodiment comprises the following components: base power S/H circuit 101, read power S/H circuit 102, write data control block 103, base power APC circuit 104 for keeping the base power monitor level, which is the output of the base power S/H circuit 101, at a predetermined desired level, overdrive power generation DAC 105 for outputting any overdrive amount, base power control signal monitor circuit 106 for monitoring the base power control signal, read power APC circuit 107 for keeping the read power monitor level, which is the output of the read power S/H circuit 102, at a predetermined desired constant value, overdrive pulse generation block 108 for generating the overdrive pulse control signal in response to write data from the write data control block 103, CPU 109 for controlling the blocks, overdrive power current amplifier 110 for converting the overdrive power control signal, which is the output of the overdrive power generation DAC 105, to an electric current and amplifying the signal by a predetermined factor, base power current amplifier 111 for converting the base power control signal, which is the output of the base power APC circuit 104, to an electric current and amplifying the signal by a predetermined factor, read power current amplifier 112 for converting the read power control signal, which is the output of the read power APC circuit 107, to an electric current and amplifying the signal by a predetermined factor, overdrive power switch 113 for determining whether to turn on/off the overdrive power current that is the output of the overdrive power current amplifier 110, base power switch 114 for determining whether to turn on/off the base power current that is the output of the base power current amplifier 111, overdrive select switch 115 for selecting one of the overdrive pulse control signal and the write data as the overdrive select output signal for use in controlling the overdrive power switch 113, laser diode 116 that emits light in response to the laser drive current, GND (Ground) 117 of the laser diode, monitor PD power supply 118 for monitoring the laser emission amount, monitor PD 119, and I-V conversion circuit 120 for converting a monitor current to a voltage for outputting the monitor level.

Figures 2A, 2B, 2C:
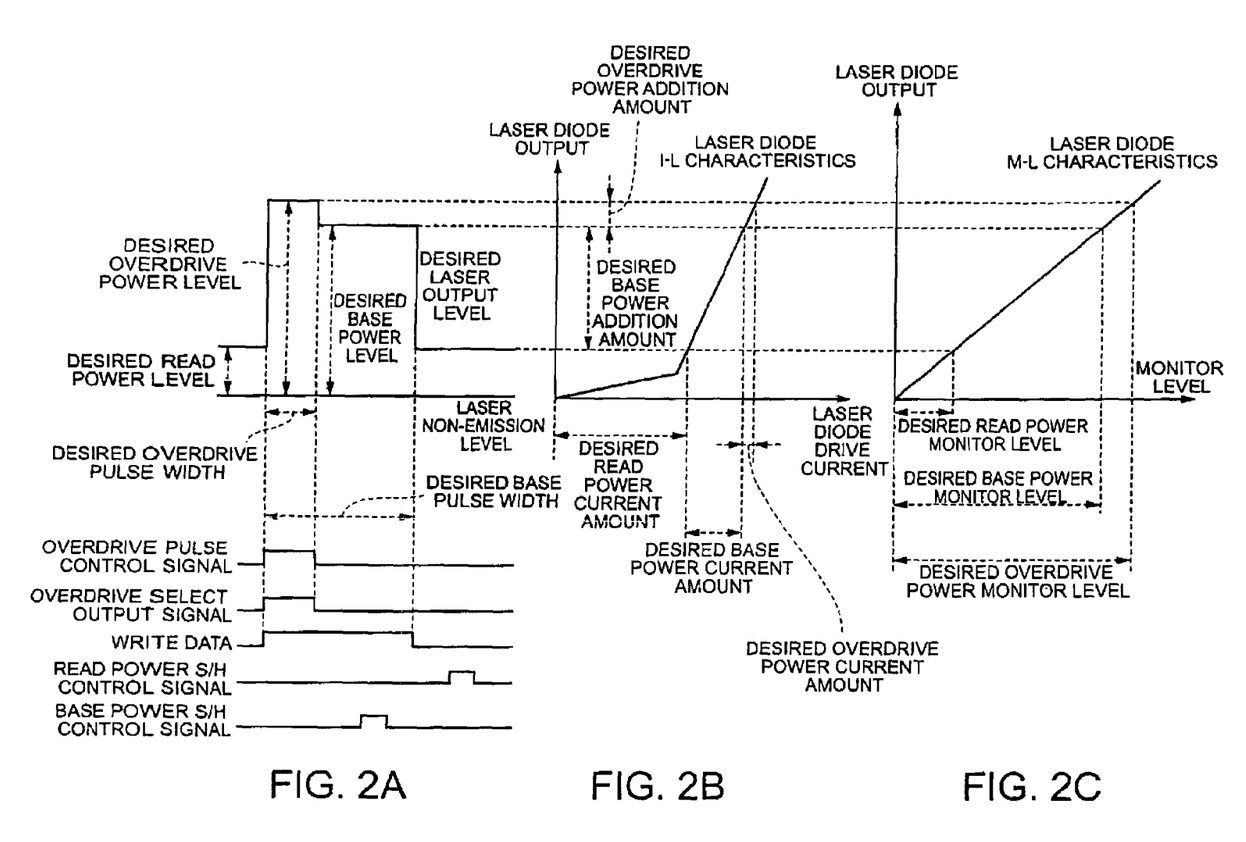
FIG. 2A is a graph showing the pulse waveforms.
FIG. 2B is a graph showing the relation between the laser drive current and the laser diode output.
FIG. 2C is a graph showing the relation between the monitor level and the laser diode output.

FIG. 2 is a graph showing how the power control apparatus 10 allows the laser diode 116 to emit light at a desired laser output level. FIG. 2A shows the pulse waveforms, FIG. 2B shows the relation between the laser drive current and the laser diode output, and FIG. 2C shows the relation between the monitor level and the laser diode output. The operation will be described below with reference to FIGS. 1 and 2.

To cause the laser diode 116 to emit light at a desired laser output level shown in FIG. 2A, the CPU 109 first sets the read power APC target setting signal to the desired read power monitor level shown in FIG. 2C and outputs this read power APC target setting signal. In response to this signal, the read power APC circuit 107 compares the read power monitor level, which is the output of the read power S/H circuit 102, with the level of the read power APC target setting signal. If the read power monitor level is lower than the level of the read power APC target setting signal, the read power APC circuit 107 raises the level of the read power control signal.

On the other hand, if the read power monitor level is equal to or higher than the level of the read power APC target setting signal, the read power APC circuit 107 lowers the level of the read power control signal. As a result, the laser drive current, which is the output of the read power current amplifier 112, increases or decreases until it becomes equal to the desired read power current amount shown in FIG. 2B and, therefore, the laser diode output is at the desired read power level shown in FIG. 2A. Because both the overdrive power switch 113 and the base power switch 114 are off at this time, the laser drive current becomes equal to the output of the read power current amplifier 112.

To output the desired base power level shown in FIG. 2A, the CPU 109 sets the base power APC target setting signal to the desired base power monitor level shown in FIG. 2C and outputs this base power APC target setting signal. In response to this signal, the base power APC circuit 104 compares the base power monitor level, which is the output of the base power S/H circuit 101, with the base power APC target setting signal. If the base power monitor level is lower than the level of the base power APC target setting signal, the base power APC circuit 104 raises the level of the base power control signal.

On the other hand, if the base power monitor level is equal to or higher than the level of the base power APC target setting signal, the base power APC circuit 104 lowers the level of the base power control signal. As a result, the base power current, which is the output of the base power current amplifier 111, increases or decreases until it becomes equal to the desired base power current amount shown in FIG. 2B and, therefore, the laser diode output is at the desired base power level shown in FIG. 2A. Because the overdrive power switch 113 is off and the base power switch 114 is on for the period of the desired base power pulse width shown in FIG. 2A, the laser drive signal during that period becomes equal to the sum of the output of the read power current amplifier 112 and the base power current which is the output of the base power current amplifier 111.

In addition, to output the desired overdrive power level shown in FIG. 2A, the CPU 109 uses the overdrive power setting signal to allow the overdrive power generation DAC 105 to output an overdrive power control signal to generate the overdrive power current. At this time, the overdrive power switch 113 is turned on for the period of the desired overdrive pulse width shown in FIG. 2A and the base power switch 114 is turned on for the period of the desired base power pulse width shown in FIG. 2A. Therefore, for the period of the desired overdrive pulse width, the laser drive current becomes equal to the sum of the output of the read power current amplifier 112, the base power current which is the output of the base power current amplifier 111, and the overdrive power current which is the output of the overdrive power current amplifier 110 and, therefore, the laser diode output is at the overdrive power level.

However, the desired overdrive pulse width shown in FIG. 2A is narrower than the desired base pulse width. Therefore, it is difficult for the S/H means to stably detect the desired overdrive power monitor level shown in FIG. 2C corresponding to the desired overdrive power level.

Figure 3A:
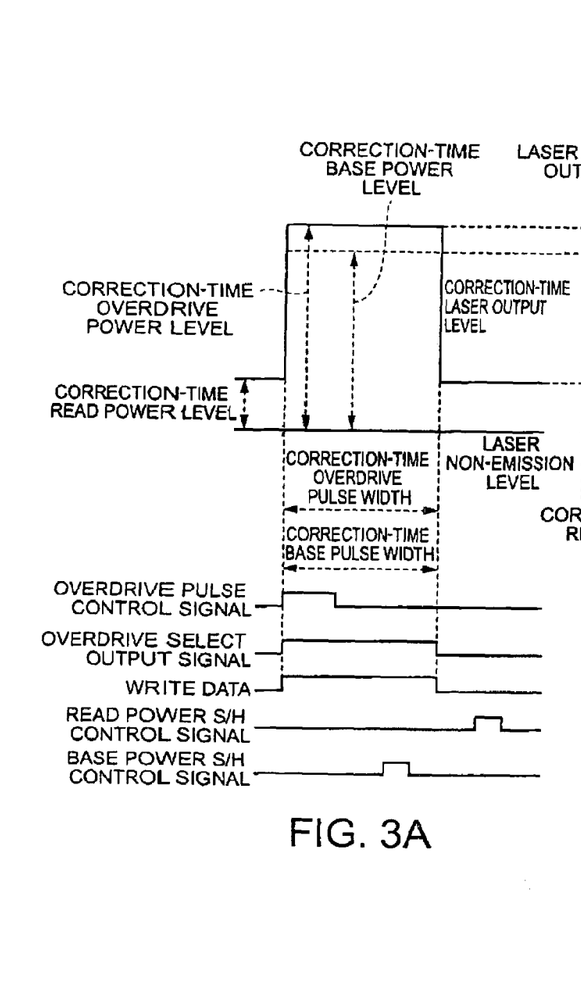
FIG. 3A is a graph showing the pulse waveforms.
Figures 3B, 3C:
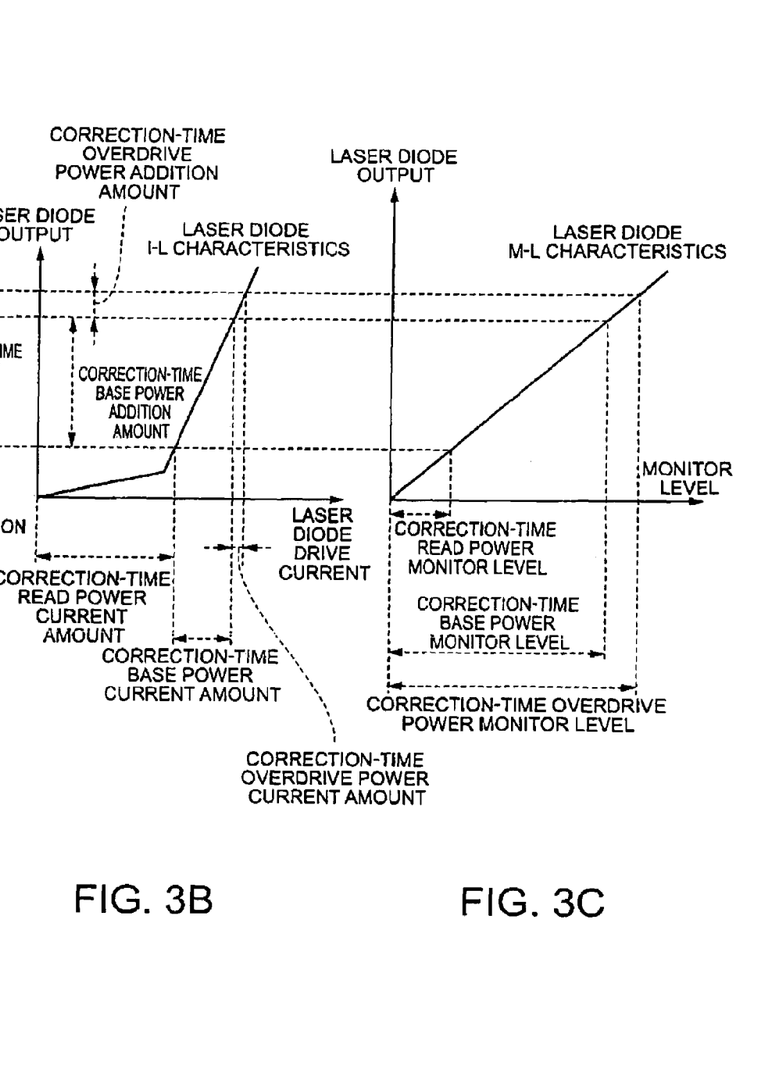
FIG. 3B is a graph showing the relation between the laser drive current and the laser diode output.
FIG. 3C is a graph showing the relation between the monitor level and the laser diode output.

FIG. 3 is a graph showing the correction operation performed by the power control apparatus 10 for outputting a desired overdrive power level. FIG. 3A shows the pulse waveforms, FIG. 3B shows the relation between the laser drive current and the laser diode output, and FIG. 3C shows the relation between the monitor level and the laser diode output. The operation will be described below with reference to FIGS. 1–3.

①. First, the CPU 109 sets the overdrive select signal "LOW" to set up the overdrive select switch 115 such that "overdrive select output signal=overdrive pulse control signal". In addition, the CPU 109 sets the overdrive power generation DAC 105, via the overdrive power setting signal, to make the overdrive power control signal a predetermined minimum value. The predetermined minimum value is the value of the overdrive power control signal that makes the overdrive power current equal to 0. This value is approximately equal to 0 here and also in the description below.

Then, using the means described above, the CPU 109 completes in advance the correction of the desired read power level and the desired base power level shown in FIG. 2A. At this time, the CPU 109 stores the base power control signal level at which the desired base power level is attained, that is, the value of the base power control monitor signal monitored by the base power control signal monitor circuit 106, as the base power control monitor signal level 1.

②. Then, the CPU 109 sets the overdrive select signal "HIGH" to set up the overdrive select switch 115 such that "overdrive select output signal=write data" and, in addition, sets the base power APC target setting signal to the desired overdrive power monitor level shown in FIG. 2C.

At this time, the correction-time base pulse width becomes equal to the correction-time overdrive pulse width as shown in FIG. 3A because the overdrive select output signal is equal to the write data. Therefore, the laser output is at the correction-time laser output level.

In this case, the base power S/H control signal, which has sampled and held the desired base power monitor level shown in FIG. 2C corresponding to the desired base power level shown in FIG. 2A, now samples and holds the correction-time overdrive power monitor level shown in FIG. 3C corresponding to the correction-time overdrive power level shown in FIG. 3A. In addition, because the base power APC target setting signal is set to the desired overdrive power monitor level shown in FIG. 2C, the base power APC circuit 104 increases or decreases the correction-time base power current shown in FIG. 3B so that the correction-time overdrive power monitor level shown in FIG. 3C becomes equal to the desired overdrive power monitor level shown in FIG. 2C.

As a result, the laser drive current, which is output at the time the correction-time overdrive power level shown in FIG. 3A corresponding to the desired overdrive power level shown in FIG. 2A is attained, is equal to "correction-time read power current amount+correction-time base power current amount+correction-time overdrive power current amount" shown in FIG. 3B. However, because the setting value of the overdrive power generation DAC 105 corresponding to the correction-time overdrive power current amount is minimized at this time, the drive current required to give the power equal to the sum of the correction-time base power addition amount and the correction-time overdrive addition amount shown in FIG. 3B is obtained primarily by increasing the correction-time base power current amount from the desired base power current amount shown in FIG. 2B.

After the first correction-time overdrive power level is attained, the CPU 109 changes the overdrive power setting signal so that the overdrive power control signal level which is the output of the overdrive power generation DAC 105 gradually increases. This increases the overdrive power current which is the output of the overdrive power current amplifier 110. Referring to FIG. 3B, the correction-time overdrive current amount that is set to the minimum at first is increased gradually.

As a result, the base power APC circuit 104 decreases the base power control signal that is the output of the circuit to keep the base power monitor level at the correction-time overdrive power monitor level shown in FIG. 3. Referring to FIG. 3B, when the correction-time overdrive power current amount increases gradually, the base power APC circuit 104 decreases the correction-time base power current amount to keep the laser diode output at a constant level.

In this case, the base power control monitor signal, which is the output of the base power control signal monitor circuit 106 monitoring the base power control signal, also decreases gradually. When the base power control monitor signal falls below the base power control signal monitor level 1 obtained in ①, the gradual decrease in the overdrive setting signal ends.

At this time, because the desired base power current amount shown in FIG. 2B almost equals the correction-time base power current amount shown in FIG. 3B, the correction-time overdrive power current amount shown in FIG. 3B almost equals the desired overdrive power current amount corresponding to the desired overdrive power addition amount shown in FIG. 2B.

③. The CPU 109 sets the overdrive select signal "LOW" to set up the overdrive select switch 115 such that "overdrive select output signal=overdrive pulse control signal" that is the normal apparatus operating condition. Then, the CPU 109 sets the base power APC target setting signal, which was changed in ②, to the desired base power monitor level shown in FIG. 2C. At this time, the desired read power level, desired overdrive power level, and desired base power level shown in FIG. 2A have been corrected.

Figure 4:
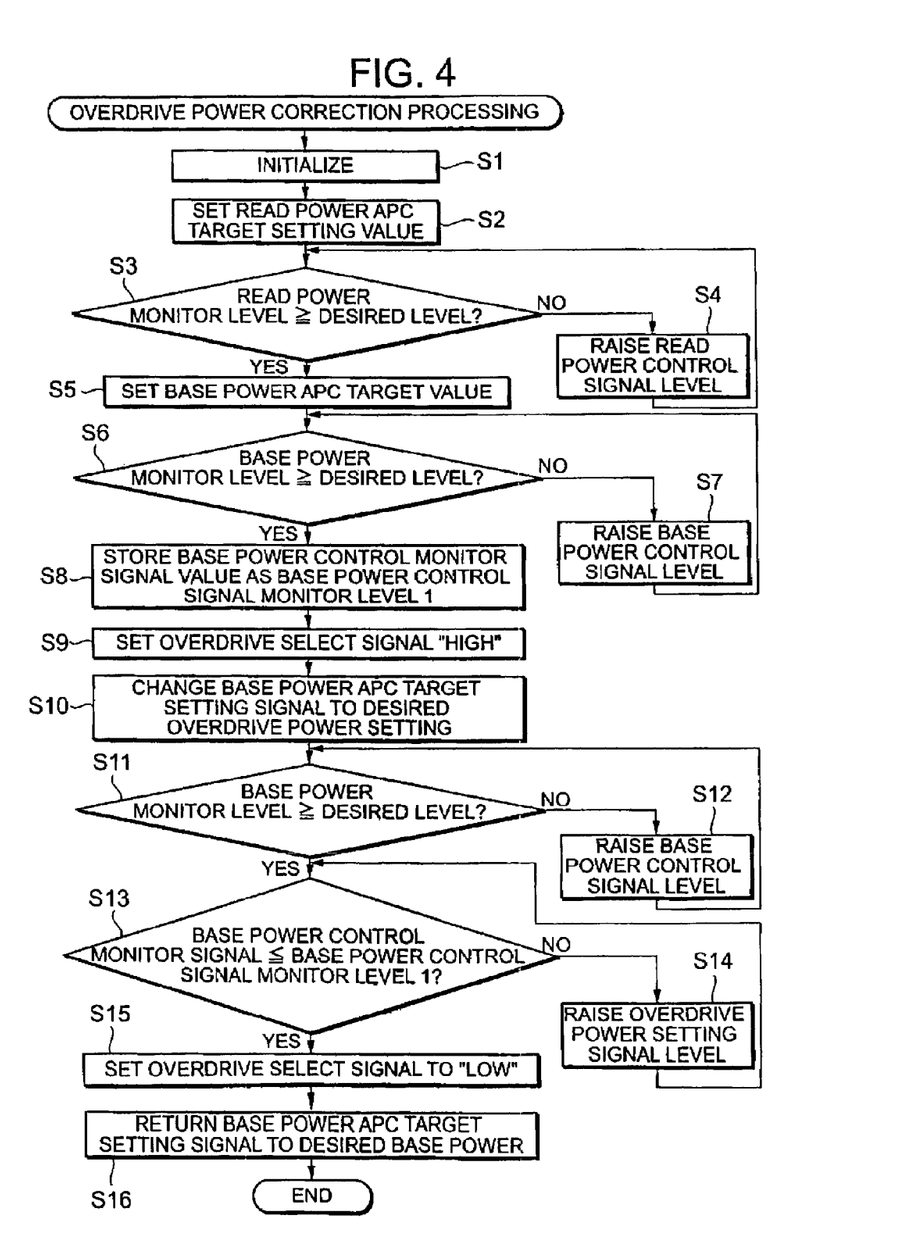
FIG. 4 is a flowchart showing the operation of overdrive power correction processing performed by the power control apparatus in FIG. 1.
Figure 5:
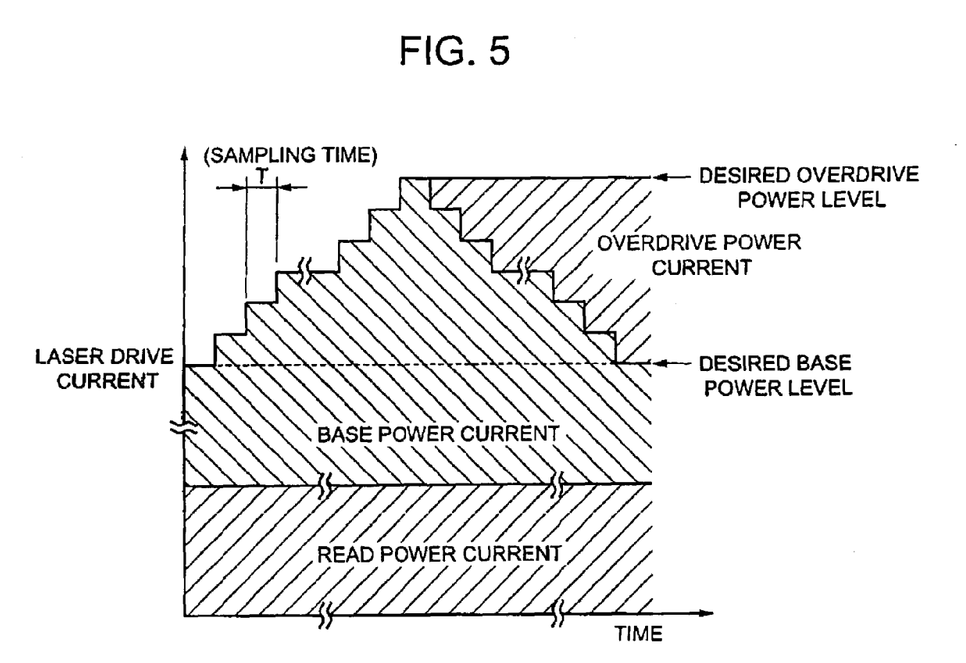
FIG. 5 is a graph showing how the laser drive current changes with respect to time in steps S10–S14 in FIG. 4.

FIG. 4 is a flowchart showing the operation of overdrive power correction processing performed by the power control apparatus 10. FIG. 5 is a graph showing the laser drive current changes with respect to time in steps S10–S14 in FIG. 4. The operation will be described below with reference to FIGS. 1–5.

When overdrive power correction processing is started, the CPU 109 executes initialization (step S1). That is the CPU 109 sets up the overdrive power generation DAC 105 via the overdrive power setting signal such that the overdrive power control signal becomes the minimum (almost 0). In addition the CPU 109 allows the write data control block 103 via the write data setting signal to output the write data, read power S/H control signal, and base power S/H control signal based on the relation shown in FIG. 2A. At the same time, the CPU 109 issues the overdrive pulse setting signal to set the overdrive pulse generation block 108 "HIGH" in synchronization with the rising edge of the write data for the period of a predetermined desired overdrive pulse width.

In this case, as shown in FIG. 2A, the read power S/H control signal is set "HIGH" at a moment in the period, during which the write data is "LOW", for the period of a predetermined read power S/H pulse width. The base power S/H control signal is set "HIGH" at a moment in the period, during which the write data is "HIGH" and the overdrive pulse control signal is "LOW", for the period of a preset base power S/H pulse width 503.

In addition, the CPU 109 sets the overdrive select signal "LOW" during initialization such that the overdrive select output signal, which is the output of the overdrive select switch 115, satisfies the relation "overdrive select output signal=overdrive pulse control signal", as shown in FIG. 2A.

Then, the CPU 109 sets the read power APC target setting signal to the preset desired read power monitor level shown in FIG. 2C (step S2).

After that, the read power monitor level, which is the monitored read power level sampled and held by the read power S/H circuit 102, is compared with the level of the read power APC target setting signal (step S3). If the read power monitor level is lower than the level of the read power APC target setting signal, the read power APC circuit 107 raises the level of the read power control signal (step S4). As a result, the laser drive current, which is the output of the read power current amplifier 112, increases, the output of the laser diode 116 increases, the monitor current which is the output of the monitor PD 119 increases, and the monitor level which is the output of the I-V conversion circuit 120 increases.

On the other hand, if the read power monitor level is equal to or higher than the read power APC target setting signal level in step S3, the CPU 109 sets the base power APC target setting signal to the target value corresponding to the preset desired base power monitor level shown in FIG. 2C (step S5).

After that, the base power monitor level, which is the monitored base power level sampled and held by the base power S/H circuit 101, is compared with the level of the base power APC target setting signal (step S6). If the base power monitor level is lower than the level of the base power APC target setting signal, the base power APC circuit 104 raises the level of the base power control signal (step S7). As a result, the base power current, which is the output of the base power current amplifier 111, increases. For the period during which the write data is "HIGH", the base power switch 114 is turned on and, for the period during which the write data is "HIGH", the output of the laser diode 116 increases. The monitor current which is the output of the monitor PD 119 increases, and the monitor level which is the output of the I-V conversion circuit 120 increases.

On the other hand, the base power control signal monitor circuit 106 monitors the base power control signal and sends the monitored signal to the CPU 109 as the base power control monitor signal. If the base power monitor level is equal to or higher than the base power APC target setting signal level in step S6, the CPU 109 stores the level of the base power control monitor signal at that time as the base power control signal monitor level 1 (step S8).

Next, the overdrive select signal is set "HIGH" such that "overdrive output signal=write data" as shown in FIG. 3A, wherein the overdrive select output signal is the output of the overdrive select switch 115 (step S9).

Next, the CPU 109 sets the base power APC target setting signal to the target value corresponding to the preset desired overdrive power monitor level shown in FIG. 2C (step S10).

Next, the base power monitor level, which is output by the base power S/H circuit 101 by sampling and holding the correction-time overdrive power monitor level shown in FIG. 3C corresponding to the correction-time overdrive power level shown in FIG. 3A, is compared with the level of the base power APC target setting signal which has been changed to the desired overdrive power monitor level (step S11).

If the base power monitor level is lower than the base power APC target setting signal level, the base power APC circuit 104 raises the level of the base power control signal (step S12). As a result, the base power current, which is the output of the base power current amplifier 111, increases. Then, the laser drive current increases for the period during which the write data is "HIGH", that is, during which the base power switch 114 is turned on, and during which the overdrive select output signal is "HIGH", that is, during which the overdrive power switch 113 is turned on. Therefore, the correction-time overdrive power level shown in FIG. 3A increases and the monitor level during that period increases. At this time, the relation "laser drive current=output of read power current amplifier 112+base power current+overdrive power current" exists. However, because the overdrive current is initialized (step S1) to the minimum value (almost 0) in advance as described above, the base power current is increased to increase the output of the laser diode 116.

On the other hand, if the base power monitor level is equal to or higher than the base power APC target setting signal level in step S11, the base power control signal monitor level 1 stored in advance in step S8 is compared with the base power control monitor signal monitored by the base power control signal monitor circuit 106 which monitors the current base power control signal (step S13). If the level of the base power control monitor signal is higher than the base power control signal monitor level 1, the CPU 109 raises the level of the overdrive power setting signal to raise the level of the overdrive power control signal which is the output of the overdrive power generation DAC 105 (step S14). As a result, the overdrive power current, which is the output of the overdrive power current amplifier 110, increases.

At this time, the relation "laser drive current=output of read power current amplifier 112+base power current+overdrive power current" exists However, the laser drive current for outputting the desired overdrive power level shown in FIG. 2A is almost constant in step S13. Therefore, the base power control signal, which is the output of the base power APC circuit 104, is reduced by the amount of increase in the overdrive power current, and the base power current, which is the output of the base power current amplifier 111, is reduced. When the base power control signal is reduced, the base power control monitor signal, which is the output of the base power control signal monitor circuit 106, is reduced.

On the other hand, if the level of the base power control monitor signal is equal to or lower than the base power monitor level 1 in step S13, the overdrive select signal is set LOW to put the overdrive select output signal, which is the output of the overdrive select switch 115, in the relation "overdrive select output signal=overdrive control signal" shown in FIG. 2A (step S15). The value of the overdrive power setting signal at this time is fixed to the overdrive power setting signal corresponding to the desired overdrive power current for subsequent use.

FIG. 5 shows how the breakdown of the laser drive current changes with respect to time.

Next, the base power APC target setting signal from the CPU 109 is set to the target value corresponding to the preset desired base power monitor level shown in FIG. 2C as set in step S5 (step S16). At this time, because the desired read power level, desired overdrive level, and desired base power level of the desired laser output level shown in FIG. 2A have been corrected, they are at the desired level.

As described above, when it is difficult to sample and hold the HIGH level period of a signal, such as that of the overdrive pulse control signal, because the period is too short, the overdrive select switch 115 is used to temporarily keep the overdrive select output signal HIGH for the period of time the write data is HIGH. In addition, the base power control signal monitor circuit 106 is provided for monitoring the base power control signal to allow the overdrive power setting signal corresponding to the desired overdrive power current to be determined. Therefore, the desired overdrive power level may be output accurately.

According to the power control apparatus and the power control method of the present invention, the overdrive power generator sets the overdrive power current to zero and the base power controller controls the base power current with the target value of the base power monitor level set to a desired overdrive power level. When the base power monitor level reaches the target value, the overdrive power generator increases the overdrive power current until the base power control signal monitored by the base power control signal monitor reaches a value corresponding to a desired base power level. In this way, the overdrive power level may be corrected using the base power controller even if there is no means for controlling the overdrive power level.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An apparatus for controlling power to be supplied to a laser diode for writing on an optical disc, wherein one pulse of the power is composed of an overdrive power level and a base power level that follows the overdrive power level, the overdrive power level being higher in level and narrower in width than the base power level, the base power level corresponding to a base power current, the overdrive power level corresponding to a sum of the base power current and an overdrive power current, said apparatus comprising:
    a base power control signal monitor that monitors the base power control signal;
    an LD (Laser Diode) output level monitor that monitors a power level output by said laser diode;
    a base power controller that controls the base power current so that a power level monitored by said LD output level monitor matches a preset target value;
    an overdrive power generator that generates the overdrive power current; and
    a main controller that, at a correction time of the power level, allows said overdrive power generator to set the overdrive power current to zero, that allows said base power controller to increase the base power current with a target value of the base power level set to the overdrive power level that is desired, and that, when the base power level has reached the target value, allows said overdrive power generator to increase the overdrive power current until the base power control signal monitored by said base power control signal monitor reaches a value corresponding to a desired base power level.

2. The apparatus according to claim 1,
    wherein, when the overdrive power current is increased by said overdrive power generator until the base power control signal matches a value corresponding to the desired base power level, the base power current is reduced by an increased amount of the overdrive power current.

3. The apparatus according to claim 1, further comprising;
    a switching unit that selects one of only the base power current and the sum of the base power current and the overdrive power current under an instruction of said main controller and supplies the selected current to said laser diode.

4. The apparatus according to claim 3,
    wherein, at the correction time of the power level, said switching unit selects the sum of the base power current and the overdrive power current.

5. The apparatus according to claim 1,
    wherein the base power current plus a predetermined value of read power current correspond to the base power level and the sum of the base power current and the overdrive power current plus the predetermined value of read power current correspond to the overdrive power level.

6. The apparatus according to claim 1, further comprising:
    a switching unit that selects one of only the read power current, a sum of the read power current and the base power current, and a sum of the read power current, the base power current, and the overdrive power current under an instruction of said main controller and supplies the selected current to said laser diode.

7. The apparatus according to claim 6,
    wherein, at the correction time of the power level, said switching unit selects the sum of the read power current, the base power current, and the overdrive power current.

8. A method for controlling power to be supplied to a laser diode for writing on an optical disc, wherein one pulse of the power to be supplied to said laser diode is composed of an overdrive power level and a base power level that follows the overdrive power level, the overdrive power level being higher in level and narrower in width than the base power level, the base power level corresponding to a base power current, the overdrive power level corresponding to a sum of the base power current and an overdrive power current, said method comprising the steps of:
    providing a base power control signal monitor that monitors the base power control signal; an LD output level monitor that monitors a power level output by said laser diode; a base power controller that controls the base power current so that a power level monitored by said LD output level monitor matches a preset target value; and an overdrive power generator that generates the overdrive power current; and
    at a correction time of the power level,
    setting, by said overdrive power generator, the overdrive power current to zero;
    increasing, by said base power controller, the base power current with a target value of the base power level set to the overdrive power level that is desired; and
    when the base power level has reached the target value, increasing, by said overdrive power generator, the overdrive power current until the base power control signal monitored by said base power control signal monitor reaches a value corresponding to a desired base power level.

9. The method according to claim 8,
wherein, when the overdrive power current is increased by said overdrive power generator until the base power control signal matches a value corresponding to the desired base power level, the base power current is reduced by an increased amount of the overdrive power current.

10. The method according to claim 8, further comprising the step of providing a switching unit that selects one of only the base power current and the sum of the base power current and the overdrive power current under an instruction of a main controller for supplying the selected current to said laser diode.

11. The method according to claim 10,
wherein, at the correction time of the power level, said switching unit selects the sum of the base power current and the overdrive power current.

12. The method according to claim 8,
wherein the base power current plus a predetermined value of read power current correspond to the base power level and the sum of the base power current and the overdrive power current plus the predetermined value of read power current correspond to the overdrive power level.

13. The method according to claim 8, further comprising the step of:
providing a switching unit that selects one of only the read power current, a sum of the read power current and the base power current, and a sum of the read power current, the base power current, and the overdrive power current under an instruction of a main controller for supplying the selected current to said laser diode.

14. The method according to claim 13,
wherein, at the correction time of the power level, said switching unit selects the sum of the read power current, the base power current, and the overdrive power current.

* * * * *